United States Patent
Yoshikawa et al.

(12) United States Patent (10) Patent No.: US 11,441,571 B2
(45) Date of Patent: Sep. 13, 2022

(54) SEALING SYSTEM

(71) Applicant: EBARA CORPORATION, Tokyo (JP)

(72) Inventors: Shigeru Yoshikawa, Tokyo (JP); Junichi Hayakawa, Tokyo (JP)

(73) Assignee: EBARA CORPORATION, Tokyo (JP)

( * ) Notice: Subject to any disclaimer, the term of this patent is extended or adjusted under 35 U.S.C. 154(b) by 360 days.

(21) Appl. No.: 16/640,931

(22) PCT Filed: Aug. 15, 2018

(86) PCT No.: PCT/JP2018/030338
§ 371 (c)(1),
(2) Date: Apr. 17, 2020

(87) PCT Pub. No.: WO2019/044504
PCT Pub. Date: Mar. 7, 2019

(65) Prior Publication Data
US 2020/0309146 A1 Oct. 1, 2020

(30) Foreign Application Priority Data

Aug. 29, 2017 (JP) .............................. JP2017-164278
Aug. 29, 2017 (JP) .............................. JP2017-164279
Aug. 29, 2017 (JP) .............................. JP2017-164280

(51) Int. Cl.
*F04D 29/12* (2006.01)
*F04D 29/58* (2006.01)
(Continued)

(52) U.S. Cl.
CPC ......... *F04D 29/124* (2013.01); *F04D 29/128* (2013.01); *F04D 29/143* (2013.01);
(Continued)

(58) Field of Classification Search
CPC .... F04D 29/124; F04D 29/126; F04D 29/128; F04D 29/143; F04D 29/146;
(Continued)

(56) References Cited

U.S. PATENT DOCUMENTS 3,679,217 A * 7/1972 Lesiecki ................ F16J 15/008
277/432
3,746,350 A 7/1973 Mayer et al.
(Continued)

FOREIGN PATENT DOCUMENTS

| GB | 1 441 653 A | 7/1976 |
|---|---|---|
| JP | S37-11315 B1 | 8/1962 |

(Continued)

OTHER PUBLICATIONS

European Search Report dated Apr. 23, 2021 issued in Patent Application No. EP 18 85 1425.1.
(Continued)

*Primary Examiner* — Richard A Edgar
*Assistant Examiner* — Jason G Davis
(74) *Attorney, Agent, or Firm* — Pearne & Gordon LLP (57) ABSTRACT

A sealing system includes: a double mechanical seal having a pump-side sealing mechanism (10, 12) and an atmospheric-side sealing mechanism (11, 13); a pump mechanism (19) driven by a rotational shaft (1); a first medium circulation line (30) for circulating a fluid barrier-and-cooling medium between a first chamber (22a) and a second chamber (22b), the first medium circulation line (30) being coupled to the first chamber (22a) and the second chamber (22b), the fluid barrier-and-cooling medium being different from a fluid handled by the centrifugal pump; a heat exchanger (21) and a shut-off valve (28) attached to the first medium circulation line (30); a second medium circulation line (31) bypassing the shut-off valve (28); and a medium
(Continued)

pressurizing pump (45) and an on-off valve (23) attached to the second medium circulation line (31).

6 Claims, 6 Drawing Sheets

(51) Int. Cl.
    *F16J 15/40*      (2006.01)
    *F04D 1/00*      (2006.01)
    *F16J 15/34*      (2006.01)
    *F04D 29/14*      (2006.01)

(52) U.S. Cl.
    CPC ......... *F04D 29/582* (2013.01); *F04D 29/586* (2013.01); *F04D 29/588* (2013.01); *F16J 15/3404* (2013.01); *F16J 15/406* (2013.01); *F04D 1/00* (2013.01)

(58) Field of Classification Search
    CPC ....... F04D 29/582; F04D 29/586; F16J 15/34; F16J 15/3404; F16J 15/406
    See application file for complete search history.

(56) References Cited

U.S. PATENT DOCUMENTS

| 3,888,495 | A | 6/1975 | Mayer |
| 5,746,435 | A | 5/1998 | Arbuckle |
| 6,070,880 | A | 6/2000 | McKeever |
| 2001/0030396 | A1 | 10/2001 | Pecht et al. |
| 2012/0242046 | A1 | 9/2012 | Spielvogel |

FOREIGN PATENT DOCUMENTS

| JP | 2011-099532 A | 5/2011 |
| WO | 2008-090994 A1 | 7/2008 |

OTHER PUBLICATIONS

International Search Report Issued in Patent Application No. PCT/JP2018/030338 dated Oct. 23, 2018.
Written Opinion Issued in Patent Application No. PCT/JP2018/030338 dated Oct. 23, 2018.
Extended European search report issued in European Patent Application No. 21209326.4 dated Mar. 4, 2022.

* cited by examiner

PRIOR ART

SEALING SYSTEM

TECHNICAL FIELD

The present invention relates to a sealing system including a double mechanical seal provided in a seal housing, and more particularly relates to a sealing system having a pump mechanism driven by a rotational shaft wherein the pump mechanism is provided between a pump-side sealing mechanism and an atmospheric-side sealing mechanism constituting a double mechanical seal.

BACKGROUND ART

When fossil fuels, such as oil and natural gas, are refined, it is necessary to remove impurities, such as carbon dioxide ($CO_2$) and sulfur (S). Sulfur is often recovered as hydrogen sulfide ($H_2S$) in a refining process. A fluid, handled by a pump used in the refining process, may contain a lot of hydrogen sulfide. Hydrogen sulfide is extremely toxic. If the hydrogen sulfide leaks into the atmosphere, it will cause serious damage to a human body. Therefore, it is necessary to pay full attention to design a pump that handles hydrogen sulfide so that the hydrogen sulfide never leaks to the outside of the pump.

Figure 6:
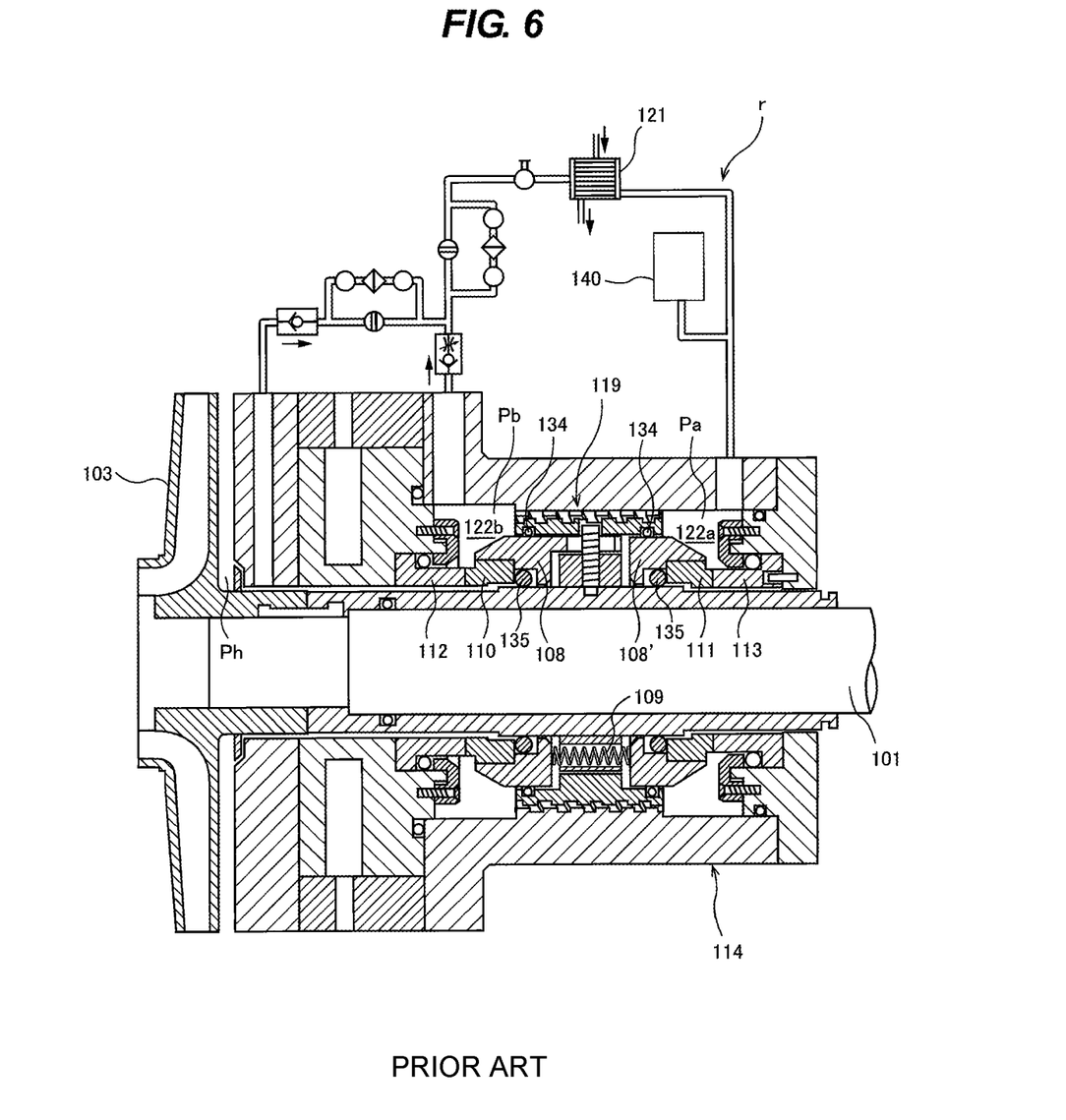
FIG. 6 is a diagram showing a conventional sealing system including a double mechanical seal.

A sealing system shown in FIG. 6 includes a double mechanical seal having a pump-side sealing mechanism (a slip ring 110 and a counter ring 112) and an atmospheric-side sealing mechanism (a slip ring 111 and a counter ring 113) which are disposed in a seal housing 114 for a rotational shaft 101 of a centrifugal pump. A pump mechanism 119, driven by the rotational shaft 101, is provided between the pump-side sealing mechanism and the atmospheric-side sealing mechanism. A first chamber 122a and a second chamber 122b are formed at both sides of the pump mechanism 119. The first chamber 122a and the second chamber 122b are formed in the seal housing 114. The atmospheric-side sealing mechanism is located in the first chamber 122a, and the atmospheric-side sealing mechanism is located in the second chamber 122b.

The pump mechanism 119 pressurizes a fluid barrier-and-cooling medium such that the medium has a pressure Pb higher than a discharge pressure Ph of the pump impeller, while the fluid barrier-and-cooling medium is delivered from the first chamber 122a to the second chamber 122b by the pump mechanism 119. The pressurized fluid barrier-and-cooling medium in the second chamber 122b can prevent a medium, pressurized by the pump impeller 103, from leaking into the second chamber 122b through the slip ring 110 and the counter ring 112 of the pump-side sealing mechanism.

The sealing system shown in FIG. 6 includes a recirculating system r located outside the seal housing 114. The recirculating system r is coupled to the first chamber 122a and the second chamber 122b, and is configured to circulate the fluid barrier-and-cooling medium. The recirculating system r includes a heat exchanger 121. The recirculating system r has a circulation path such that the fluid barrier-and-cooling medium, pressurized by the pump mechanism 119, reaches the heat exchanger 121 via the second chamber 122b, the fluid barrier-and-cooling medium is cooled by the heat exchanger 121, and the fluid barrier-and-cooling medium is then returned to the first chamber 122a and reaches the pump mechanism 119.

The fluid barrier-and-cooling medium is a fluid itself handled by the centrifugal pump, and is pressurized in advance by the pump impeller 103 and injected into the sealing system. When the fluid barrier-and-cooling medium in the sealing system decreases due to leakage, the fluid, handled by the centrifugal pump, is pressurized by the pump impeller 103 to refill the sealing system. Therefore, when the fluid, handled by the pump, contains a toxic or flammable fluid, such high-pressure dangerous fluid exists in the immediate vicinity of the atmospheric air, and may leakage to the outside.

The pressure of the fluid barrier-and-cooling medium applied to the atmospheric-side sealing mechanism is equivalent to the discharge pressure of the centrifugal pump when the centrifugal pump is not in operation. Thus, when the fluid, handled by the pump, contains a toxic or flammable fluid, such a high-pressure dangerous fluid may leak to the outside. When the centrifugal pump is not in operation and the fluid barrier-and-cooling medium in the sealing system is reduced due to leakage, a fluid barrier-and-cooling medium, stored beforehand in an accumulator 140, is supplied into the sealing system.

By the way, in FIG. 6, the pump mechanism 119 serves to pressurize the fluid barrier-and-cooling medium and send it from the first chamber 122a to the second chamber 122b. As a result, a large quantity of heat is generated around the pump mechanism 119. If the heat is left as it is, it may cause interference between components or deformation of components due to thermal expansion, or may cause plastic deformation of sealing materials, such as O-rings 134, 135, thereby possibly impairing the sealing function. In order to prevent this, the heat exchanger 121 is provided in the sealing system to positively cool the fluid barrier-and-cooling medium.

However, a driving force for circulating the fluid barrier-and-cooling medium through the sealing system is generated by the pump mechanism 119. Therefore, if the centrifugal pump is stopped due to a power failure or other cause, the pump mechanism 119 is also stopped simultaneously. As a result, the heat generated in the operation immediately before the stop is not dissipated, and temperatures of components around the pump mechanism 119 may rise to an unacceptable level.

Carrier sleeves 108, 108' shown in FIG. 6 are pressed away from each other by a spring 109 provided between them. Ends of the carrier sleeves 108, 108' press the slip rings 110, 111 against the counter rings 112, 113, respectively. During operation of the centrifugal pump, the carrier sleeve 108 is pressed toward the atmospheric side by the pressure Pb in the second chamber 122b. On the other hand, the pressure Pa in the first chamber 122a is applied to the carrier sleeve 108'. Therefore, a differential pressure Pb-Pa is applied to the combination of the carrier sleeves 108, 108' as a whole in a direction from the pump side to the atmospheric side. For this reason, the pressure on the sealing surfaces of the slip ring 111 and the counter ring 113 at the atmospheric side is higher than that when the operation is not in operation, and therefore the sealing effect increases. However, the pressure on the sealing surfaces of the slip ring 110 and the counter ring 112 at the pump side is lower than that when the operation is not in operation, and as a result, the sealing effect decreases.

On the contrary, when the pressure in the first chamber 122a becomes higher than the pressure in the second chamber 122b, a differential pressure Pa-Pb is applied to the combination of the carrier sleeves 108, 108' as a whole in a direction from the atmospheric side to the pump side. For this reason, the pressure on the sealing surfaces of the slip ring 111 and the counter ring 113 at the atmospheric side becomes lower than that when the operation is not in operation. As a result, the sealing effect is reduced, and the fluid barrier-and-cooling medium is likely to leak.

CITATION LIST

Patent Literature

Patent document 1: UK patent No. 1,441,653
Patent document 2: International Publication No. WO2008/090994

SUMMARY OF INVENTION

Technical Problem

As described above, in the technique shown in FIG. 6, the pump impeller 103 pressurizes the fluid, to be handled by the centrifugal pump, to supply it to the sealing system, so that the pressurized fluid is used as the leak prevention fluid (or the fluid barrier-and-cooling medium) of the sealing system. The pressure of the fluid barrier-and-cooling medium applied to the atmospheric-side sealing mechanism is equivalent to the discharge pressure of the centrifugal pump when the operation of the centrifugal pump is not in operation. Accordingly, when the fluid, to be handled by the pump, contains toxic or flammable fluid, such high-pressure dangerous fluid exists in the immediate vicinity of the atmospheric air, and may leakage to the outside.

Furthermore, when the operation of the pump mechanism 119 is stopped due to a power failure or other cause, it is necessary to avoid an increase in temperature of components. However, the sealing system of FIG. 6 is insufficient to avoid the temperature increase.

As the fluid barrier-and-cooling medium, a harmless liquid, such as oil, may be used which is different from the fluid handled by the pump. However, in this case, it is necessary to provide an oil replenishment mechanism that replenishes the sealing system with oil during operation when the oil pressure decreases due to leakage or other cause. It is necessary for such an oil replenishment mechanism that the replenishment of oil does not prevent the flow of oil pressurized by the pump mechanism 119. If the flow of oil pressurized by the pump mechanism 119 is disrupted, the heat generated near the pump mechanism 119 is not dissipated, and the temperature of peripheral devices of the pump mechanism 119 may rise to an unacceptable temperature.

Further, when the pressure in the first chamber 122a at the atmospheric side becomes higher than the pressure in the second chamber 122b at the pump side as a result of the replenishment of oil, a differential pressure Pa-Pb is applied to the combination of the carrier sleeves 108 and 108' as a whole in a direction from the atmospheric side to the pump side, thus causing a decrease in the pressure on the sealing surfaces of the slip ring 111 and the counter ring 113 at the atmospheric side. As a result, the sealing effect is reduced, and the risk of leakage increases.

When the pump impeller of the centrifugal pump rotates in the reverse direction, the pump mechanism 119 also rotates in the reverse direction. In this case, the pressure Pa in the first chamber 122a is higher than the pressure Pb in the second chamber 122b. A differential pressure Pa-Pb is applied to the combination of the carrier sleeves 108 and 108' as a whole in a direction from the atmospheric side to the pump side, thus causing a decrease in the pressure on the sealing surfaces of the slip ring 111 and the counter ring 113 at the atmospheric side. As a result, the sealing effect is reduced, and the risk of leakage of the fluid barrier-and-cooling medium increases.

As described above, in consideration of the case where the fluid to be handled by the pump contains a toxic or flammable fluid, the technique shown in FIG. 6 cannot be used as it is. It is necessary to design the pump so as not to allow such a harmful fluid to flow outside through the sliding surfaces of the mechanical seal.

It is a first object of the present invention to provide a sealing system that can appropriately cool a double mechanical seal and a pump mechanism, and does not allow a fluid, handled by a pump, to leak into an atmospheric side during normal operation and power failure, even in a case where the fluid, handled by the pump, contains a toxic or flammable fluid.

It is a second object of the present invention to provide a sealing system that can be safely and appropriately replenished with a fluid barrier-and-cooling medium during normal operation when pressure in the sealing system is lowered due to leakage of the fluid barrier-and-cooling medium, in a case where the fluid, handled by the pump, contains a toxic or flammable fluid.

It is a third object of the present invention to provide a sealing system that does not allow a fluid, handled by a pump, to leak into an atmospheric side even when a centrifugal pump and a pump mechanism rotate in a reverse direction, in a case where the fluid, handled by the pump, contains a toxic or flammable fluid.

Solution to Problem

In one aspect, there is provided a sealing system for sealing a rotational shaft of a centrifugal pump, comprising: a double mechanical seal having a pump-side sealing mechanism and an atmospheric-side sealing mechanism; a pump mechanism driven by the rotational shaft, the pump mechanism being located between the pump-side sealing mechanism and the atmospheric-side sealing mechanism; a first chamber defined by at least the atmospheric-side sealing mechanism and the pump mechanism; a second chamber defined by at least the pump-side sealing mechanism and the pump mechanism; a first medium circulation line for circulating a fluid barrier-and-cooling medium between the first chamber and the second chamber, the first medium circulation line being coupled to the first chamber and the second chamber, the fluid barrier-and-cooling medium being different from a fluid handled by the centrifugal pump; a heat exchanger and a shut-off valve attached to the first medium circulation line; a second medium circulation line having both ends coupled to the first medium circulation line, the second medium circulation line bypassing the shut-off valve; and a medium pressurizing pump and an on-off valve attached to the second medium circulation line.

In one aspect, the sealing system further includes a seal housing that accommodates the double mechanical seal therein, the first medium circulation line and the second medium circulation line being located outside the seal housing.

In one aspect, the sealing system further comprises: a power failure detector configured to detect a power failure of the centrifugal pump; and a system controller configured to, upon receiving a power failure detection signal transmitted from the power failure detector, close the shut-off valve, open the on-off valve, and start the medium pressurizing pump.

In one aspect, a first connection point at which one end of the second medium circulation line is coupled to the first medium circulation line is located between the shut-off valve and the heat exchanger; and a second connection point at which the other end of the second medium circulation line is coupled to the first medium circulation line is located between the shut-off valve and the second chamber.

In one aspect, the sealing system further includes a power source for supplying power to the medium pressurizing pump, the medium pressurizing pump having an electric motor as a prime mover.

In one aspect, the fluid barrier-and-cooling medium is oil, and the pressurizing medium pump is an oil pump.

The present invention can provide the sealing system that can appropriately cool the double mechanical seal and the pump mechanism, and can prevent leakage of a fluid, handled by the pump, into the atmospheric side during both normal operation and stoppage of the centrifugal pump and the pump mechanism, in a case where the fluid, handled by the pump, contains a toxic or flammable fluid.

In one aspect, there is provided a sealing system for sealing a rotational shaft of a centrifugal pump, comprising: a double mechanical seal having a pump-side sealing mechanism and an atmospheric-side sealing mechanism; a pump mechanism driven by the rotational shaft, the pump mechanism being located between the pump-side sealing mechanism and the atmospheric-side sealing mechanism; a first chamber defined by at least the atmospheric-side sealing mechanism and the pump mechanism; a second chamber defined by at least the pump-side sealing mechanism and the pump mechanism; a medium circulation line for circulating a fluid barrier-and-cooling medium between the first chamber and the second chamber, the medium circulation line being coupled to the first chamber and the second chamber, the fluid barrier-and-cooling medium being different from a fluid handled by the centrifugal pump; a heat exchanger attached to the medium circulation line; a branch line coupled to the medium circulation line; an accumulator coupled to the branch line, the accumulator being configured to pressurize and store a fluid barrier-and-cooling medium; an on-off valve attached to the branch line; a pressure detector arranged to measure pressure in the first chamber; a pressure detector arranged to measure pressure in the second chamber; and a system controller configured to open the on-off valve when the pressure in the second chamber is lower than a threshold value. The threshold value is higher than discharge pressure of the centrifugal pimp.

In one aspect, the branch line and the accumulator are located between the heat exchanger and the first chamber.

In one aspect, the sealing system further includes a pressure detector arranged to measure discharge pressure of the centrifugal pump, and the threshold value varies according to the discharge pressure.

In one aspect, the system controller is configured to close the on-off valve when the pressure in the first chamber is higher than the pressure in the second chamber.

In one aspect, the sealing system further comprise: a medium reservoir configured to store a fluid barrier-and-cooling medium therein; a pump line coupled to the medium reservoir and the medium circulation line; and a medium pressurizing pump for pressurizing the fluid barrier-and-cooling medium supplied from the medium reservoir, the medium pressurizing pump being attached to the pump line, wherein a connection point of the pump line and the medium circulation line is located between the accumulator and the first chamber.

In one aspect, the system controller is configured to start the medium pressurizing pump when the on-off valve is open and the pressure in the second chamber is lower than the threshold value.

In one aspect, the system controller is configured to close the on-off valve or stop the operation of the medium pressurizing pump when the medium pressurizing pump is operated and the pressure in the first chamber is higher than the pressure in the second chamber.

In one aspect, the fluid barrier-and-cooling medium is oil, and the pressurizing medium pump is an oil pump.

The present invention can provide the sealing system that can be appropriately cooled and replenished with the fluid barrier-and-cooling medium without lowering the sealing performance of the double mechanical seal even if the fluid barrier-and-cooling medium in the sealing system leaks with age, in a case where the fluid, handled by the pump, contains a toxic or flammable fluid.

In one aspect, there is provided a sealing system for sealing a rotational shaft of a centrifugal pump, comprising: a double mechanical seal having a pump-side sealing mechanism and an atmospheric-side sealing mechanism; a pump mechanism driven by the rotational shaft, the pump mechanism being located between the pump-side sealing mechanism and the atmospheric-side sealing mechanism; a first chamber defined by at least the atmospheric-side sealing mechanism and the pump mechanism; a second chamber defined by at least the pump-side sealing mechanism and the pump mechanism; a medium circulation line for circulating a fluid barrier-and-cooling medium between the first chamber and the second chamber, the medium circulation line being coupled to the first chamber and the second chamber, the fluid barrier-and-cooling medium being different from a fluid handled by the centrifugal pump; a heat exchanger attached to the medium circulation line; a bypass line coupled to the medium circulation line; a check valve attached to the bypass line; a branch line coupled to the medium circulation line; an accumulator configured supply a pressurized fluid barrier-and-cooling medium to the second chamber, the accumulator being coupled to the branch line; and an isolation valve attached to the branch line, wherein the check valve is configured to allow the fluid barrier-and-cooling medium to flow only in a direction from the first chamber to the second chamber.

In one aspect, a first connection point at which one end of the bypass line is coupled to the medium circulation line is located between the first chamber and the heat exchanger, and a second connection point at which other end of the bypass line is coupled to the medium circulation line is located between the heat exchanger and the second chamber.

In one aspect, a first connection point at which one end of the bypass line is coupled to the medium circulation line, and a second connection point at which other end of the bypass line is coupled to the medium circulation line are located between the heat exchanger and the second chamber.

In one aspect, there is provided a sealing system for sealing a rotational shaft of a centrifugal pump, comprising: a double mechanical seal having a pump-side sealing mechanism and an atmospheric-side sealing mechanism; a pump mechanism driven by the rotational shaft, the pump mechanism being located between the pump-side sealing mechanism and the atmospheric-side sealing mechanism; a first chamber defined by at least the atmospheric-side sealing mechanism and the pump mechanism; a second chamber defined by at least the pump-side sealing mechanism and the pump mechanism; a medium circulation line for circulating a fluid barrier-and-cooling medium between the first chamber and the second chamber, the medium circulation line being coupled to the first chamber and the second chamber, the fluid barrier-and-cooling medium being different from a fluid handled by the centrifugal pump; a heat exchanger attached to the medium circulation line; a bypass line coupled to the medium circulation line; an on-off valve attached to the bypass line; a system controller configured to open the on-off valve when pressure in the first chamber is higher than pressure in the second chamber; a branch line coupled to the medium circulation line; an accumulator configured supply a pressurized fluid barrier-and-cooling medium to the second chamber, the accumulator being coupled to the branch line; and an isolation valve attached to the branch line.

In one aspect, a first connection point at which one end of the bypass line is coupled to the medium circulation line, and a second connection point at which other end of the bypass line is coupled to the medium circulation line are located between the heat exchanger and the second chamber.

According to the present invention, when the pump mechanism reversely rotates and the pressure of the fluid barrier-and-cooling medium in the first chamber becomes higher than the pressure of the fluid barrier-and-cooling medium in the second chamber, the fluid barrier-and-cooling medium flows from the first chamber through the bypass line to the second chamber, so that the pressure in the second chamber is maintained. As a result, the fluid barrier-and-cooling medium is prevented from leaking to the atmospheric side.

DESCRIPTION OF EMBODIMENTS

Embodiments of the present invention will be described below with reference to the drawings.

Figure 1:
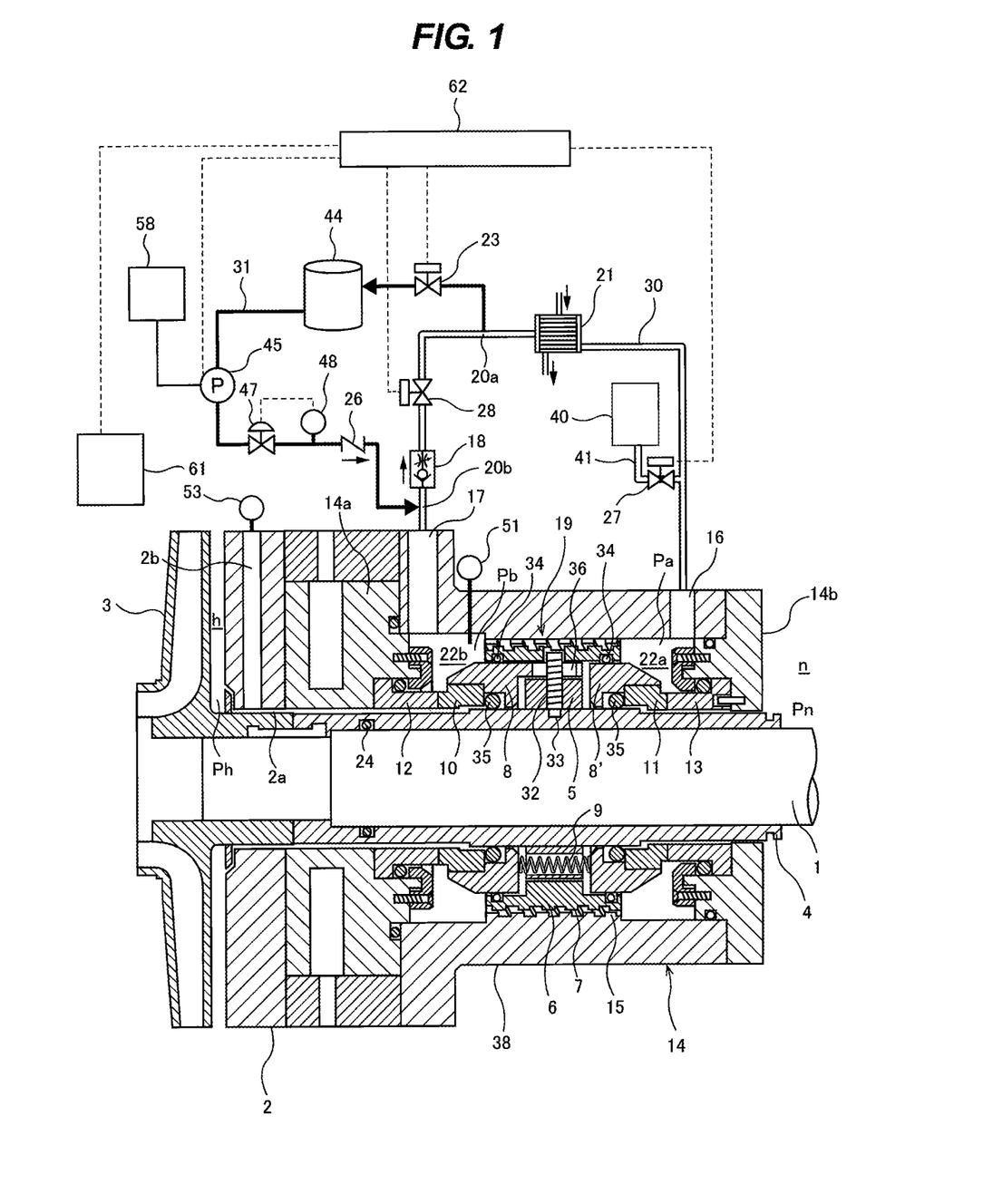
FIG. 1 is a diagram showing an embodiment of a sealing system including a double mechanical seal.

FIG. 1 is a view showing an embodiment of a sealing system including a double mechanical seal. The double mechanical seal has a function of sealing a gap between a rotational shaft 1 and a partition wall 2 that separates a high-pressure side h and a low-pressure side n.

In FIG. 1, at the high-pressure side h, a pump impeller 3 of a centrifugal pump is fixed to the rotational shaft 1, and a shaft sleeve 4 extends over an axial length of the double mechanical seal. The shaft sleeve 4 is fixed to an outer peripheral surface of the rotational shaft 1. An O-ring 24 is provided between the shaft sleeve 4 and the rotational shaft 1, and seals so as to prevent leakage of a fluid, handled by the centrifugal pump, through a gap between the shaft sleeve 4 and the rotational shaft 1. The fluid, handled by the centrifugal pump, contains a toxic fluid or a flammable fluid.

The pump impeller 3 and a seal housing 14 are separated by the partition wall 2. The rotational shaft 1 and a part of the pump impeller 3 extend through a through-hole 2a formed in the partition wall 2. The partition wall 2 has a radial hole 2b communicating with the through-hole 2a. During operation of the centrifugal pump, the radial hole 2b is filled with the fluid pressurized by the pump impeller 3. A pressure detector 53 is coupled to the radial hole 2b, so that a discharge pressure Ph of the pump impeller 3 is measured by the pressure detector 53.

A cylindrical ring 5 has an inner peripheral surface in contact with the outer peripheral surface of the shaft sleeve 4. The cylindrical ring 5 is located at substantially the center of the shaft sleeve 4. A hollow cylindrical body 6 is fixed to the ring 5. An axial length of the ring 5 is shorter than axial lengths of the shaft sleeve 4 and the hollow cylindrical body 6. The hollow cylindrical body 6 has axially extending portions on both sides of an outer peripheral portion thereof. An axial length of an inner peripheral portion of the hollow cylindrical body 6 is the same as the axial length of the ring 5. The inner peripheral portion of the hollow cylindrical body 6 faces the outer periphery of the ring 5. The shaft sleeve 4, the ring 5, and the hollow cylindrical body 6 are arranged coaxially. A thread groove 7 is formed in the outer peripheral surface of the hollow cylindrical body 6.

The ring 5 and the hollow cylindrical body 6 have a threaded hole extending therethrough in the radial direction. The ring 5 and the hollow cylindrical body 6 are fixed by a screw 32 inserted into the threaded hole. The tip end of the screw 32 engages with a recess 33 of the shaft sleeve 4. The hollow cylindrical body 6 is fixed by the screw 32 such that the hollow cylindrical body 6 does not rotate and does not move axially relative to the ring 5.

Two carrier sleeves 8, 8' are fitted in an annular recess defined by the shaft sleeve 4, the ring 5, and the hollow cylindrical body 6. These carrier sleeves 8, 8' are arranged at both sides of the ring 5. O-rings 34 are arranged between outer surfaces of the carrier sleeves 8, 8' and the inner surface of the hollow cylindrical body 6. O-rings 35 are arranged between inner surfaces of the carrier sleeves 8, 8' and the outer surface of the shaft sleeve 4. The carrier sleeves 8, 8' can be displaced in the axial direction of the rotational shaft 1, but cannot rotate because the carrier sleeves 8, 8' are fixed by an axial protrusion 36 that contacts the screw 32.

A spring 9 is arranged between the carrier sleeves 8, 8'. The spring 9 serves to push the carrier sleeves 8, 8' apart from each other. Slip rings 10, 11 are attached to surfaces, apart from the ring 5, of the carrier sleeves 8, 8', respectively. The slip rings 10, 11 are pressed by the spring 9 against counter rings 12, 13, respectively. The counter rings 12, 13 are fixed to a pump-side cover 14a and an atmospheric-side cover 14b of the seal housing 14, respectively. The reference numeral 14 denotes the entirety of the seal housing. The combination of the slip ring 10 and the counter ring 12 constitutes a pump-side sealing mechanism of the double mechanical seal, and the combination of the slip ring 11 and the counter ring 13 constitutes an atmospheric-side sealing mechanism of the double mechanical seal.

The slip rings 10, 11 and the counter rings 12, 13, constituting the double mechanical seal, are accommodated in the seal housing 14. More specifically, the seal housing 14 has a hollow cylindrical portion 38 surrounding the double mechanical seal in the center of the hollow cylindrical portion 38. A thread groove 15 is formed in an inner surface of the hollow cylindrical portion 38. The thread groove 15 faces the thread groove 7 with a small radial gap therebetween. The thread groove 15 and the thread groove 7 have lead directions opposite to each other. The thread groove 7 is a male screw that rotates together with the rotational shaft 1, and the thread groove 15 is a female screw which is stationary. The thread groove 15 surrounds the thread groove 7. The thread groove 7 and the thread groove 15 constitute a pump mechanism 19 driven by the rotational shaft 1. The pump mechanism 19 is located between the pump-side sealing mechanism (the slip ring 10 and counter ring 12) and the atmospheric-side sealing mechanism (the slip ring 11 and the counter ring 13) of the double mechanical seal.

An annular first chamber 22a and an annular second chamber 22b exist on both sides of the pump mechanism 19. The first chamber 22a is a room at the low-pressure side n, and is a room defined by the pump mechanism 19, the carrier sleeve 8', the slip ring 11, the counter ring 13, the atmospheric-side cover 14b, and the hollow cylindrical portion 38. The hollow cylindrical portion 38 has an inlet 16 coupled to a first medium circulation line 30 which will be described later, and the first chamber 22a is coupled to the inlet 16.

The second chamber 22b is a room at the high-pressure side h, and is a room defined by the pump mechanism 19, the carrier sleeve 8, the slip ring 10, the counter ring 12, the pump-side cover 14a, and the hollow cylindrical portion 38. The hollow cylindrical portion 38 has an outlet 17 coupled to the first medium circulation line 30, and the second chamber 22b is coupled to the outlet 17. The outlet 17 communicates with the inlet 16 through the first medium circulation line 30.

The sealing system includes the medium circulation line 30 coupled to the first chamber 22a and the second chamber 22b, a second medium circulation line 31 coupled to the first medium circulation line 30, a throttle and check valve 18 constituted by a combination of a throttle valve and a check valve, a shut-off valve 28 which is closed when the second medium circulation line 31 is used, a heat exchanger 21 configured to cool the fluid barrier-and-cooling medium, and an accumulator 40 which stores a pressurized fluid barrier-and-cooling medium therein in a normal operation and pressurizes the fluid barrier-and-cooling medium in the first medium circulation line 30 in an emergency by opening an on-off valve 27. Both ends of the second medium circulation line 31 are coupled to the first medium circulation line 30. The second medium circulation line 31 extends so as to bypass the shut-off valve 28.

A diaphragm (not shown) is arranged inside the accumulator 40, and a gas, such as nitrogen gas, is enclosed in the accumulator 40. The fluid barrier-and-cooling medium stored in the accumulator 40 is pressurized by the pressure of the gas. Therefore, the accumulator 40 has a function of storing the fluid barrier-and-cooling medium under pressure.

One end of the first medium circulation line 30 is coupled to the inlet 16, and the other end of the first medium circulation line 30 is coupled to the outlet 17. The throttle and check valve 18, the heat exchanger 21, and the shut-off valve 28 are attached to the first medium circulation line 30. The heat exchanger 21 is located between the shut-off valve 28 and the first chamber 22a, and the throttle and check valve 18 is located between the shut-off valve 28 and the second chamber 22b. The accumulator 40 is coupled to a branch line 41 extending from the first medium circulation line 30, and the on-off valve 27 is attached to the branch line 41. The accumulator 40 is coupled to the first medium circulation line 30 via the branch line 41. The branch line 41 and the accumulator 40 are located between the heat exchanger 21 and the first chamber 22a.

One end of the second medium circulation line 31 is coupled to the first medium circulation line 30 at a first connection point 20a, and the other end of the second medium circulation line 31 is coupled to the first medium circulation line 30 at a second connection point 20b. The first connection point 20a is located between the heat exchanger 21 and the shut-off valve 28, and the second connection point 20b is located between the second chamber 22b and the shut-off valve 28. In the present embodiment, the second connection point 20b is located between the outlet 17 and the throttle and check valve 18.

The sealing system further includes a medium reservoir 44 for storing the fluid barrier-and-cooling medium therein, a medium pressurizing pump 45 for pressurizing the fluid barrier-and-cooling medium supplied from the medium reservoir 44, an on-off valve 23 located between the first connection point 20a and the medium pressurizing pump 45, a check valve 26 located between the medium pressurizing pump 45 and the second connection point 20b, and a pressure regulating valve 47 and a pressure detector 48 located between the medium pressurizing pump 45 and the check valve 26. The pressure detector 48 is located downstream of the pressure regulating valve 47. The medium reservoir 44, the medium pressurizing pump 45, the on-off valve 23, the pressure regulating valve 47, the pressure detector 48, and the check valve 26 are attached to the second medium circulation line 31. The first medium circulation line 30 and the second medium circulation line 31 are arranged outside the seal housing 14. The first medium circulation line 30 and the second medium circulation line 31 are filled with the fluid barrier-and-cooling medium.

The sealing system further includes a power failure detector 61 for detecting a power failure, and a system controller 62 for controlling operations of the shut-off valve 28, the on-off valve 23, the on-off valve 27, and the medium pressurizing pump 45 described above. When the power failure detector 61 detects a power failure, the power failure detector 61 emits a power failure detection signal, and sends the power failure detection signal to the system controller 62. The system controller 62 is configured to, upon receiving the power failure detection signal, close the shut-off valve 28, open the on-off valve 23, and start the medium pressurizing pump 45. Each of the shut-off valve 28, the on-off valve 23, and the on-off valve 27 may be an electromagnetic valve, a motor-operated valve, a pneumatically driven valve, a hydraulically driven valve, or the like.

The sealing system includes a pressure detector 53 for measuring the discharge pressure Ph of the pump impeller 3, and a pressure detector 51 for measuring the pressure Pb in the second chamber 22b. The pressure detectors 53, 51 are coupled to the system controller 62.

The sealing system including the double mechanical seal provided within the seal housing 14 uses the fluid barrier-and-cooling medium. The fluid barrier-and-cooling medium is a medium having properties unrelated to the fluid handled by the centrifugal pump, and is a medium having no toxicity or danger. In one embodiment, the fluid barrier-and-cooling medium is oil, and the medium pressurizing pump 45 is an oil pump. In the present embodiment, the medium pressurizing pump 45 includes an electric motor as a prime mover.

Operations of the sealing system having the above configuration will be described below. The inside of the first medium circulation line 30 is filled with the fluid barrier-and-cooling medium having pressure equal to or higher than the discharge pressure Ph of the pump impeller 3 of the centrifugal pump. During normal operation, the on-off valve 23 is closed and the shut-off valve 28 is open. When the rotational shaft 1 rotates during the normal operation, the pump mechanism 19 sucks the fluid barrier-and-cooling medium in the first chamber 22a and pressurizes it, and discharges the fluid barrier-and-cooling medium to the second chamber 22b. The fluid barrier-and-cooling medium pressurized by the operation of the pump mechanism 19 returns to the first chamber 22a through the first medium circulation line 30.

The pressure Pb in the second chamber 22b becomes higher than the discharge pressure Ph of the pump impeller 3 by the throttle and check valve 18 attached to the first medium circulation line 30. While the fluid barrier-and-cooling medium flows through the first medium circulation line 30 from the throttle and check valve 18 to the inlet 16, the pressure of the fluid barrier-and-cooling medium decreases due to pressure loss. As a result, the pressure Pa of the fluid barrier-and-cooling medium in the first chamber 22a is lower than Pb. Since the pressure Pb in the second chamber 22b is higher than the discharge pressure Ph of the pump impeller 3, the fluid, handled by the centrifugal pump, does not enter the second chamber 22b via the sealing surfaces of the slip ring 10 and the counter ring 12 that constitute the pump-side sealing mechanism.

The carrier sleeve 8 is pushed by the pressure Pb in the second chamber 22b in a direction from the pump side to the atmospheric side. Since the pressure Pa in the first chamber 22a is applied to the carrier sleeve 8', a differential pressure Pb-Pa is applied to the combination of the carrier sleeves 8, 8' as a whole from the pump side to the atmospheric side. As a result, the pressure applied to the sealing surfaces of the slip ring 11 and the counter ring 13, constituting the atmospheric-side sealing mechanism, is higher than that when the pump mechanism 19 is not in operation, thereby increasing the sealing effect and reliably preventing the leakage of the fluid, handled by the pump, to the atmospheric side.

When the fluid barrier-and-cooling medium flows through the first medium circulation line 30, the fluid barrier-and-cooling medium is cooled by the heat exchanger 21 provided on the first medium circulation line 30. The cooled fluid barrier-and-cooling medium is returned to the first chamber 22a through the first medium circulation line 30 and the inlet 16. In this way, during operation of the centrifugal pump, the fluid barrier-and-cooling medium circulates between the first chamber 22a and the second chamber 22b through the first medium circulation line 30 while being cooled by the heat exchanger 21. The cooled fluid barrier-and-cooling medium cools the pump mechanism 19, so that the temperatures of the pump mechanism 19 and peripheral devices (for example, the O-rings 34, 35) do not become high.

By the way, when a power failure occurs, the pump impeller 3 of the centrifugal pump stops and the pump mechanism 19 also stops. Thus, when the power failure detector 61 detects the power failure, the power failure detector 61 sends the power failure detection signal to the system controller 62. The system controller 62 closes the shut-off valve 28 attached to the first medium circulation line 30, opens the on-off valve 23, and starts the medium pressurizing pump 45. Since the medium pressurizing pump 45 is required to operate during the power failure, the medium pressurizing pump 45 is coupled to a power source 58 which is different from the power source for operating the centrifugal pump. The power source 58 supplies electric power to the medium pressurizing pump 45 to cause the medium pressurizing pump 45 to operate. The power source 58 may be composed of a battery, a diesel engine driven generator, or the like.

The medium pressurizing pump 45 pressurizes the fluid barrier-and-cooling medium supplied from the medium reservoir 44. The pressurized fluid barrier-and-cooling medium passes through the pressure regulating valve 47 and the check valve 26, and flows into the first medium circulation line 30 at the second connection point 20b. The fluid barrier-and-cooling medium further flows through the outlet 17 into the second chamber 22b. The medium pressurizing pump 45 is configured to be able to pressurize the fluid barrier-and-cooling medium to a pressure higher than the discharge pressure Ph of the pump impeller 3. Since the shut-off valve 28 is already closed, no fluid barrier-and-cooling medium flows toward the throttle and check valve 18.

The fluid barrier-and-cooling medium in the second chamber 22b that has been delivered from the medium pressurizing pump 45 flows through the gap between the thread groove 7 and the thread groove 15 of the pump mechanism 19 to reach the first chamber 22a. The difference between the pressure Pb in the second chamber 22b and the pressure Pa in the first chamber 22a is determined by a discharge flow rate of the medium pressurizing pump 45 and a resistance applied to the fluid passing through the pump mechanism 19 that is not in operation. The discharge pressure of the medium pressurizing pump 45 is adjusted by the pressure regulating valve 47 such that the outlet pressure of the check valve 26 measured by the pressure detector 51 is higher than the pressure Ph measured by the pressure detector 53. The discharge pressure of the medium pressurizing pump 45 is measured by the pressure detector 48, and the pressure regulating valve 47 operates based on the pressure measurement value sent from the pressure detector 48.

The fluid barrier-and-cooling medium further flows from the first chamber 22a through the inlet 16 into the first medium circulation line 30. The fluid barrier-and-cooling medium flows through the first medium circulation line 30, is cooled by the heat exchanger 21, enters the second medium circulation line 31 at the first connection point 20a, and returns to the medium reservoir 44 via the on-off valve 23. The cooled fluid barrier-and-cooling medium in the medium reservoir 44 is delivered again to the second chamber 22b by the medium pressurizing pump 45.

The cooled fluid barrier-and-cooling medium in the second chamber 22b flows to the first chamber 22a via the pump mechanism 19, and is cooled again by the heat exchanger 21. Since the fluid barrier-and-cooling medium also contacts the double mechanical seal (the slip rings 10, 11 and the counter rings 12, 13) provided in the seal housing 14, the fluid barrier-and-cooling medium can remove the heat of the entire double mechanical seal. In addition, the fluid barrier-and-cooling medium can quickly cool the double mechanical seal and its surroundings, thereby preventing interference between components due to thermal expansion, and preventing plastic deformation of elastic seals, such as the O-rings 34, 35. Therefore, their sealing functions can be maintained. As a result, the safety of the centrifugal pump increases.

The medium pressurizing pump 45 delivers the fluid barrier-and-cooling medium, cooled by the heat exchanger 21, to the second chamber 22b at a pressure higher than the discharge pressure Ph of the pump impeller 3, so that the fluid, handled by the centrifugal pump, is prevented from entering the second chamber 22b. Further, since the fluid barrier-and-cooling medium pressurized by the medium pressurizing pump 45 flows from the second chamber 22b to the first chamber 22a through the pump mechanism 19, the pressure in the first chamber 22a is reduced to a pressure lower than the pressure in the second chamber 22b. As a result, a differential pressure Pb-Pa is applied to the combination of the carrier sleeves 8, 8' as a whole in the direction from the pump side to the atmospheric side. Therefore, the sealing surfaces of the slip ring 11 and the counter ring 13 at the atmospheric side can maintain their sealing effect not only when the centrifugal pump is in operation, but also when the centrifugal pump is not in operation. The difference between the pressure Pb in the second chamber 22b and the pressure Pa in the first chamber 22a is determined by the discharge flow rate of the medium pressurizing pump 45 and the resistance applied to the fluid passing through the pump mechanism 19 that is not in operation. The flow rate of the medium pressurizing pump 45 is selected so that an appropriate pressure difference Pb-Pa is achieved.

As discussed above, the present invention can provide the sealing system that can appropriately cool the double mechanical seal and the pump mechanism 19, and can prevent leakage of the fluid, handled by the pump, into the atmospheric side during both normal operation and a halt of the centrifugal pump and the pump mechanism 19, in a case where the fluid, handled by the pump, contains a toxic or flammable fluid.

Next, another embodiment of the present invention will be described with reference to FIG. 2. Configurations of this embodiment, which will not be particularly described, are the same as those of the embodiment shown in FIG. 1, and their repetitive descriptions are omitted. In the following descriptions, the first medium circulation line 30 will be simply referred to as medium circulation line 30.

The sealing system includes the medium circulation line 30 coupled to the first chamber 22a and the second chamber 22b, throttle and check valve 18 constituted by a combination of a throttle valve and a check valve, heat exchanger 21 configured to cool the fluid barrier-and-cooling medium, and accumulator 40 which stores a pressurized fluid barrier-and-cooling medium therein in a normal operation and pressurizes the fluid barrier-and-cooling medium in the medium circulation line 30 in an emergency by opening on-off valve 27. The medium circulation line 30 is arranged outside the seal housing 14. The medium circulation line 30 is filled with the fluid barrier-and-cooling medium. The on-off valve 27 may be an electromagnetic valve, a motor-operated valve, a pneumatically driven valve, a hydraulically driven valve, or the like.

A diaphragm (not shown) is arranged inside the accumulator 40, and a gas, such as nitrogen gas, is enclosed in the accumulator 40. The fluid barrier-and-cooling medium stored in the accumulator 40 is pressurized by the pressure of the gas. Therefore, the accumulator 40 has a function of storing the fluid barrier-and-cooling medium under pressure. The pressure of the fluid barrier-and-cooling medium stored in the accumulator 40 is equal to or higher than the discharge pressure Ph of the pump impeller 3 of the centrifugal pump.

One end of the medium circulation line 30 is coupled to the inlet 16, and the other end of the medium circulation line 30 is coupled to the outlet 17. The throttle and check valve 18 and the heat exchanger 21 are attached to the medium circulation line 30. The accumulator 40 is coupled to the branch line 41 extending from the medium circulation line 30. The on-off valve 27 is attached to the branch line 41. The accumulator 40 is coupled to the medium circulation line 30 via the branch line 41. The branch line 41 and the accumulator 40 are located between the heat exchanger 21 and the first chamber 22a.

One end of a pump line 43 is coupled to the medium circulation line 30. The other end of the pump line 43 is coupled to a medium reservoir 44 that stores a fluid barrier-and-cooling medium. A medium pressurizing pump 45 and a check valve 46 are attached to the pump line 43. The medium pressurizing pump 45 is coupled to the medium circulation line 30 via the pump line 43 and the branch line 41. The check valve 46 is configured to allow the fluid barrier-and-cooling medium, pressurized by the medium pressurizing pump 45, to flow toward the medium circulation line 30 and not to allow the fluid bather-and-cooling medium to flow backward The medium pressurizing pump 45 is configured to be capable of pressurizing the fluid barrier-and-cooling medium, supplied from the medium reservoir 44, to pressure equal to or higher than the discharge pressure Ph of the pump impeller 3 of the centrifugal pump. The fluid barrier-and-cooling medium, pressurized by the medium pressurizing pump 45, flows through the check valve 46 and is supplied to the medium circulation line 30.

Figure 2:
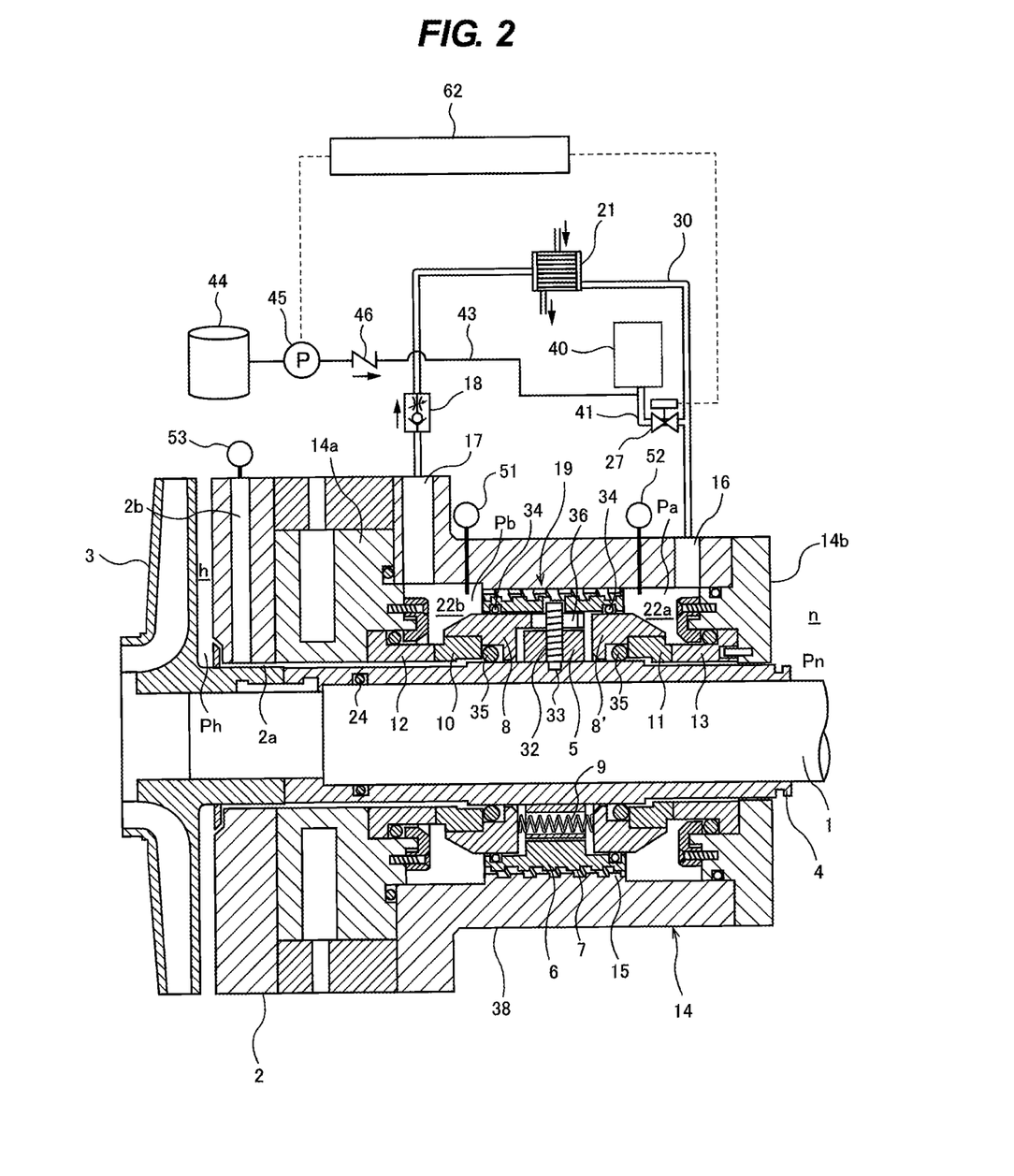
FIG. 2 is a diagram showing another embodiment of the sealing system.

The pump line 43 may be directly coupled to the medium circulation line 30, or may be coupled to the branch line 41 extending between the on-off valve 27 and the accumulator 40 as shown in FIG. 2. Alternatively, the on-off valve 27 may be a three-way valve. One of three connection ports of the three-way valve may be coupled to the medium circulation line 30, the other one may be coupled to the accumulator 40, and the remaining one may be coupled to the pump line 43. A connection point of the pump line 43 and the medium circulation line 30 is located between the accumulator 40 and the first chamber 22a.

The sealing system further includes system controller 62 configured to control operations of the on-off valve 27 and the medium pressurizing pump 45 described above. Further, the sealing system includes pressure detector 53 for measuring the discharge pressure Ph of the pump impeller 3, pressure detector 51 for measuring the pressure Pb in the second chamber 22b, and pressure detector 52 for measuring the pressure Pa in the first chamber 22a. The pressure detectors 53, 51, 52 are coupled to the system controller 62. The system controller 62 is configured to manipulate the on-off valve 27 and/or the medium pressurizing pump 45 based on measured values of the pressure transmitted from the pressure detectors 53, 51, 52.

The sealing system with the double mechanical seal provided within the seal housing 14 uses the fluid barrier-and-cooling medium. The fluid barrier-and-cooling medium is a medium having properties unrelated to the fluid handled by the centrifugal pump, and is a medium having no toxicity or danger. In one embodiment, the fluid barrier-and-cooling medium is oil, and the medium pressurizing pump 45 is an oil pump. In the present embodiment, the medium pressurizing pump 45 includes an electric motor as a prime mover.

Operations of the sealing system having the above configuration will be described below. The inside of the medium circulation line 30 is filled with the fluid barrier-and-cooling medium having pressure equal to or higher than the discharge pressure Ph of the pump impeller 3 of the centrifugal pump. When the rotational shaft 1 rotates during the normal operation, the pump mechanism 19 sucks the fluid barrier-and-cooling medium in the first chamber 22a and pressurizes it, and discharges the fluid barrier-and-cooling medium to the second chamber 22b. The fluid barrier-and-cooling medium pressurized by the operation of the pump mechanism 19 returns to the first chamber 22a through the medium circulation line 30.

The pressure Pb in the second chamber 22b becomes higher than the discharge pressure Ph of the pump impeller 3 by the throttle and check valve 18 attached to the medium circulation line 30. While the fluid barrier-and-cooling medium flows through the medium circulation line 30 from the throttle and check valve 18 to the inlet 16, the pressure of the fluid barrier-and-cooling medium decreases due to pressure loss. As a result, the pressure Pa of the fluid barrier-and-cooling medium in the first chamber 22a is lower than Pb. Since the pressure Pb in the second chamber 22b is higher than the discharge pressure Ph of the pump impeller 3, the fluid, handled by the centrifugal pump, does not enter the second chamber 22b via the sealing surfaces of the slip ring 10 and the counter ring 12 that constitute the pump-side sealing mechanism.

The carrier sleeve 8 is pushed by the pressure Pb in the second chamber 22b in a direction from the pump side to the atmospheric side. Since the pressure Pa in the first chamber 22a is applied to the carrier sleeve 8', a differential pressure Pb-Pa is applied to the combination of the carrier sleeves 8, 8' as a whole from the pump side to the atmospheric side. As a result, the pressure applied to the sealing surfaces of the slip ring 11 and the counter ring 13, constituting the atmospheric-side sealing mechanism, is higher than that when the pump mechanism 19 is not in operation, thereby increasing the sealing effect and reliably preventing the leakage of the fluid, handled by the pump, to the atmospheric side.

When the fluid barrier-and-cooling medium flows through the medium circulation line 30, the fluid barrier-and-cooling medium is cooled by the heat exchanger 21 provided on the medium circulation line 30. The cooled fluid barrier-and-cooling medium is returned to the first chamber 22a through the medium circulation line 30 and the inlet 16. In this way, during operation of the centrifugal pump, the fluid barrier-and-cooling medium circulates between the first chamber 22a and the second chamber 22b through the medium circulation line 30 while being cooled by the heat exchanger 21. The cooled fluid barrier-and-cooling medium cools the pump mechanism 19, so that the temperatures of the pump mechanism 19 and peripheral devices (for example, the O-rings 34, 35) do not become high.

By the way, the pressure of the fluid barrier-and-cooling medium in the sealing system decreases over time due to some causes including a small amount of leakage through the sealing mechanisms for the fluid barrier-and-cooling medium. Thus, the pressure Pb in the second chamber 22b is measured by the pressure detector 51. When the pressure Pb is lower than a threshold value, the system controller 62 opens the on-off valve 27 to supply the fluid barrier-and-cooling medium in the accumulator 40 to the medium circulation line 30. In order to prevent a large amount of fluid barrier-and-cooling medium from flowing into the first chamber 22a at the suction side of the pump mechanism 19 and to prevent rapid increase in pressure in the first chamber 22a when the on-off valve 27 is opened, a throttle mechanism may preferably be provided upstream or downstream of the on-off valve 27.

The threshold value is higher than the discharge pressure Ph of the centrifugal pump. The threshold value may vary according to the discharge pressure Ph. In one embodiment, the threshold value may be a value determined by multiplying the discharge pressure Ph by a predetermined coefficient. For example, the discharge pressure Ph of the pump impeller 3 is measured by the pressure detector 53, and the system controller 62 multiplies the discharge pressure Ph by 1.05 (this value can be set arbitrarily) to determine the threshold value. Then, the pressure Pb in the second chamber 22b is measured by the pressure detector 51, and the system controller 62 compares the pressure Pb with the threshold value. The system controller 62 opens the on-off valve 27 when the pressure Pb is lower than the threshold value.

The pressure Pa in the first chamber 22a at the atmospheric side is measured by the pressure detector 52. When the pressure Pa is higher than the pressure Pb in the second chamber 22b, the system controller 62 closes the on-off valve 27.

Even when the on-off valve 27 is open, if the pressure Pb is lower than the threshold value, the system controller 62 starts the medium pressurizing pump 45. The pressure of the fluid barrier-and-cooling medium is increased by the medium pressurizing pump 45, and is supplied to the medium circulation line 30. Specifically, the fluid barrier-and-cooling medium is supplied into the first chamber 22a at the suction side of the pump mechanism 19. When the pressure Pa in the first chamber 22a is higher than the pressure Pb in the second chamber 22b, the system controller 62 closes the on-off valve 27 or stops the operation of the medium pressurizing pump 45.

According to the above configurations, the fluid barrier-and-cooling medium supplied does not hinder the flow of the fluid barrier-and-cooling medium pressurized by the pump mechanism 19. This is because, according to the present embodiment, the fluid barrier-and-cooling medium is injected not into the discharge side of the pump mechanism 19 but into the suction side of the pump mechanism 19. Therefore, the heat generated in the vicinity of the pump mechanism 19 is delivered smoothly, along with the fluid barrier-and-cooling medium, to the heat exchanger 21, and is dissipated in the heat exchanger 21. Therefore, temperatures of devices arranged around the pump mechanism 19 do not increase.

When the pressure Pa in the first chamber 22a is higher than the pressure Pb in the second chamber 22b, the system controller 62 closes the on-off valve 27 or stops the operation of the medium pressurizing pump 45. As a result, a differential pressure of Pb-Pa is applied to the combination of the sleeves 8, 8' as a whole in a direction from the pump side to the atmospheric side. Therefore, the pressure applied to the sealing surfaces of the slip ring 11 and the counter ring 13, constituting the atmospheric-side sealing mechanism, does not decrease, and therefore the sealing effect can be maintained. Further, not only the backup of the pressure retained by the accumulator 40, but also the supply of the fluid barrier-and-cooling medium by the medium pressurizing pump 45 as a mechanism for multiply pressurizing can be achieved. Therefore, the safety can be improved.

Figure 3:
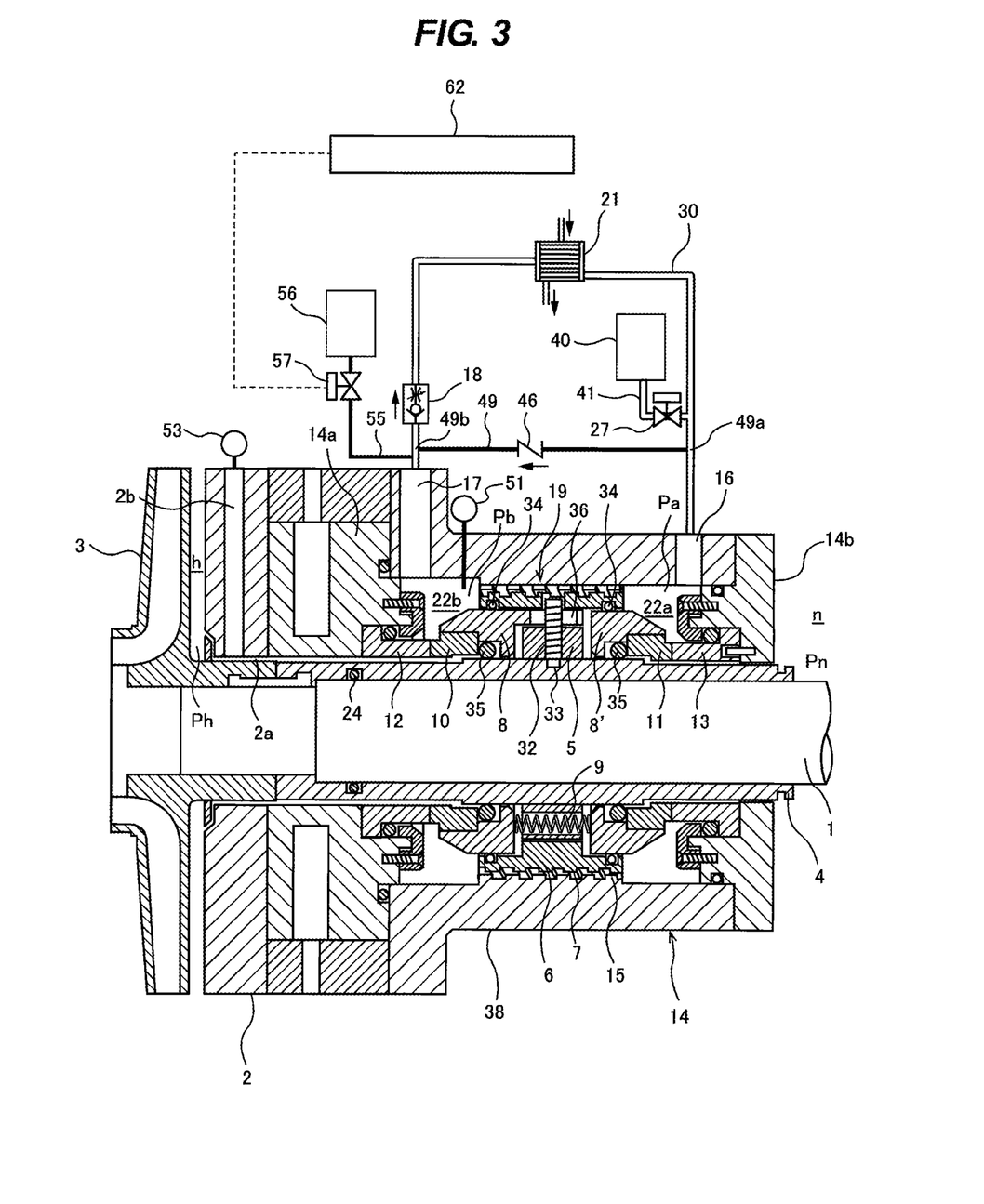
FIG. 3 is a diagram showing still another embodiment of the sealing system.

Next, another embodiment of the present invention will be described with reference to FIG. 3. Configurations of this embodiment, which will not be particularly described, are the same as those of the embodiment shown in FIG. 1, and therefore their repetitive descriptions are omitted. In the following descriptions, the first medium circulation line 30 will be simply referred to as medium circulation line 30.

The sealing system includes the medium circulation line 30 coupled to the first chamber 22a and the second chamber 22b, a bypass line 49 having both ends coupled to the medium circulation line 30, a check valve 46 attached to the bypass line 49, throttle and check valve 18 constituted by a combination of a throttle valve and a check valve, heat exchanger 21 configured to cool the fluid barrier-and-cooling medium, and accumulator 40 which stores a pressurized fluid barrier-and-cooling medium therein in a normal operation and pressurizes the fluid barrier-and-cooling medium in the medium circulation line 30 in an emergency by opening on-off valve 27. The medium circulation line 30 is arranged outside the seal housing 14. The medium circulation line 30 and the bypass line 49 are filled with the fluid barrier-and-cooling medium.

A diaphragm (not shown) is arranged inside the accumulator 40, and a gas, such as nitrogen gas, is enclosed in the accumulator 40. The fluid barrier-and-cooling medium stored in the accumulator 40 is pressurized by the pressure of the gas. Therefore, the accumulator 40 has a function of storing the fluid barrier-and-cooling medium under pressure. The pressure of the fluid barrier-and-cooling medium stored in the accumulator 40 is equal to or higher than the discharge pressure Ph of the pump impeller 3 of the centrifugal pump.

One end of the medium circulation line 30 is coupled to the inlet 16, and the other end of the medium circulation line 30 is coupled to the outlet 17. The throttle and check valve 18 and the heat exchanger 21 are attached to the medium circulation line 30. The accumulator 40 is coupled to branch line 41 extending from the medium circulation line 30. The on-off valve 27 is attached to the branch line 41. The accumulator 40 is coupled to the medium circulation line 30 via the branch line 41. The branch line 41 and the accumulator 40 are located between the heat exchanger 21 and the first chamber 22a.

The sealing system includes pressure detector 53 for measuring the discharge pressure Ph of the pump impeller 3, and pressure detector 51 for measuring the pressure Pb in the second chamber 22b. The pressure detectors 53, 51 are coupled to the system controller 62.

The sealing system with the double mechanical seal provided within the seal housing 14 uses the fluid barrier-and-cooling medium. The fluid barrier-and-cooling medium is a medium having properties unrelated to the fluid handled by the centrifugal pump, and is a medium having no toxicity or danger. In one embodiment, the fluid barrier-and-cooling medium is oil.

Operations of the sealing system having the above configuration will be described below. The inside of the medium circulation line 30 is filled with the fluid barrier-and-cooling medium having pressure equal to or higher than the discharge pressure Ph of the pump impeller 3 of the centrifugal pump. When the rotational shaft 1 rotates during the normal operation, the pump mechanism 19 sucks the fluid barrier-and-cooling medium in the first chamber 22a and pressurizes it, and discharges the fluid barrier-and-cooling medium to the second chamber 22b. The fluid barrier-and-cooling medium pressurized by the operation of the pump mechanism 19 returns to the first chamber 22a through the medium circulation line 30.

The pressure Pb in the second chamber 22b becomes higher than the discharge pressure Ph of the pump impeller 3 by the throttle and check valve 18 attached to the medium circulation line 30. While the fluid barrier-and-cooling medium flows through the medium circulation line 30 from the throttle and check valve 18 to the inlet 16, the pressure of the fluid barrier-and-cooling medium decreases due to pressure loss. As a result, the pressure Pa of the fluid barrier-and-cooling medium in the first chamber 22a is lower than Pb. Since the pressure Pb in the second chamber 22b is higher than the discharge pressure Ph of the pump impeller 3, the fluid, handled by the centrifugal pump, does not enter the second chamber 22b via the sealing surfaces of the slip ring 10 and the counter ring 12 that constitute the pump-side sealing mechanism.

The carrier sleeve 8 is pushed by the pressure Pb in the second chamber 22b in a direction from the pump side to the atmospheric side. Since the pressure Pa in the first chamber 22a is applied to the carrier sleeve 8', a differential pressure Pb-Pa is applied to the combination of the carrier sleeves 8, 8' as a whole from the pump side to the atmospheric side. As a result, the pressure applied to the sealing surfaces of the slip ring 11 and the counter ring 13, constituting the atmospheric-side sealing mechanism, is higher than that when the pump mechanism 19 is not in operation, thereby increasing the sealing effect and reliably preventing the leakage of the fluid, handled by the pump, to the atmospheric side.

When the fluid barrier-and-cooling medium flows through the medium circulation line 30, the fluid barrier-and-cooling medium is cooled by the heat exchanger 21 provided on the medium circulation line 30. The cooled fluid barrier-and-cooling medium is returned to the first chamber 22a through the medium circulation line 30 and the inlet 16. In this way, during operation of the centrifugal pump, the fluid barrier-and-cooling medium circulates between the first chamber 22a and the second chamber 22b through the medium circulation line 30 while being cooled by the heat exchanger 21. The cooled fluid barrier-and-cooling medium cools the pump mechanism 19, so that the temperatures of the pump mechanism 19 and peripheral devices (for example, the O-rings 34, 35) do not become high.

By the way, the pump impeller 3 of the centrifugal pump may rotate reversely during an initial operation, immediately after installation of the centrifugal pump. In addition to the initial operation, there is a case where two centrifugal pumps are arranged in parallel and one is operating and the other is stopped as a back-up machine. If a malfunction occurs in a discharge-side check valve (not shown) arranged at a discharge outlet of the centrifugal pump serving as the back-up machine, a fluid discharged from the operating centrifugal pump may flow backward through the other centrifugal pump that is not in operation. As a result, a pump impeller of the stopped centrifugal pump may rotate in the reverse direction.

If the pump impeller 3 rotates in the reverse direction as described above, the pump mechanism 19, which operates together with the rotation of the pump impeller 3, also rotates in the reverse direction. When the pump impeller 3 rotates in the reverse direction, a centrifugal force is generated in the fluid, handled by the pump, to a certain degree, and the fluid is pressurized. As a result, the pressure of the fluid is applied to the sliding surfaces of the slip ring 10 and the counter ring 12. On the other hand, when the pump mechanism 19 rotates in the reverse direction, the fluid barrier-and-cooling medium in the second chamber 22b is pressurized and delivered to the first chamber 22a. Since the throttle and check valve 18 does not allow the fluid barrier-and-cooling medium to flow into the second chamber 22b, the pressure in the second chamber 22b decreases, and the fluid, handled by the centrifugal pump, may eventually enter the second chamber 22b through the sealing surfaces of the slip ring 10 and the counter ring 12.

Moreover, the pressure Pa in the first chamber becomes higher than the pressure Pb in the second chamber, and a differential pressure of Pa-Pb is applied to the combination of the carrier sleeves 8, 8' as a whole in a direction from the atmospheric side to the pump side. As a result, the pressure on the sealing surfaces of the slip ring 11 and the counter ring 13 at the atmospheric side is lowered, and the sealing effect is reduced, thus possibly causing the leakage of the fluid barrier-and-cooling medium.

Therefore, the sealing system of the present embodiment includes a bypass line 49 coupled to the medium circulation line 30. A first connection point 49a at which one end of the bypass line 49 is coupled to the medium circulation line 30 is near the inlet 16 and the first chamber 22a, and a second connection point 49b at which the other end of the bypass line 49 is coupled to the medium circulation line 30 is near the outlet 17 and the second chamber 22b. More specifically, the first connection point 49a is located between the first chamber 22a and the heat exchanger 21, and the second connection point 49b is located between the heat exchanger 21 and the second chamber 22b. In this embodiment, the first connection point 49a is located between the first chamber 22a and the branch line 41, and the second connection point 49b is located between the throttle and check valve 18 and the second chamber 22b. A check valve 46, attached to the bypass line 49, allows the fluid barrier-and-cooling medium to flow only in a direction from the first connection point 49a to the second connection point 49b (i.e., in a direction from the first chamber 22a to the second chamber 22b), and does not allow the fluid barrier-and-cooling medium to flow in the reverse direction.

Further, one end of a branch line 55 is coupled to the medium circulation line 30, and the other end of the branch line 55 is coupled to an accumulator 56. An isolation valve 57 is attached to the branch line 55. The isolation valve 57 may be composed of an electromagnetic valve, a motor-operated valve, a pneumatically driven valve, a hydraulically driven valve, or the like. The opening and closing operation of the isolation valve 57 is controlled by system controller 62. A connection point of the branch line 55 and the medium circulation line 30 is located between the second chamber 22b and the heat exchanger 21. More specifically, the connection point of the branch line 55 and the medium circulation line 30 is located between the second chamber 22b and the throttle and check valve 18.

A diaphragm (not shown) is arranged inside the accumulator 56, and a gas, such as nitrogen gas, is enclosed in the accumulator 56. The fluid barrier-and-cooling medium stored in the accumulator 56 is pressurized by the pressure of the gas. Therefore, the accumulator 56 has a function of storing the fluid barrier-and-cooling medium under pressure. The pressure of the fluid barrier-and-cooling medium stored in the accumulator 56 is equal to or higher than the discharge pressure Ph of the pump impeller 3 of the centrifugal pump.

According to such configurations, even if the pump mechanism 19 rotates in the reverse direction, the fluid barrier-and-cooling medium immediately flows from the first connection point 49a, which is close to the first chamber 22a, to the second chamber 22b through the bypass line 49, so that the pressure in the second chamber 22b can be maintained. As a result, the fluid barrier-and-cooling medium in the second chamber 22b can prevent the fluid, handled by the centrifugal pump, from entering the sealing surfaces of the slip ring 10 and the counter ring 12 at the pump side. Moreover, the fluid barrier-and-cooling medium in the second chamber 22b prevents a decrease in pressure on the sealing surfaces of the slip ring 11 and the counter ring 13 at the atmospheric side, and can therefore prevent the fluid barrier-and-cooling medium from leaking to the atmospheric side.

When the system controller 62 detects that the difference between the pressure Pb in the second chamber 22b measured by the pressure detector 51 and the discharge pressure Ph of the pump impeller 3 measured by the pressure detector 53 is less than a threshold value, the system controller 62 opens the isolation valve 57 to allow the fluid barrier-and-cooling medium under pressure in the accumulator 56 to flow into the medium circulation line 30. The fluid barrier-and-cooling medium is supplied to the second chamber 22b through the medium circulation line 30, whereby the pressure in the second chamber 22b can be maintained. As a result, the fluid barrier-and-cooling medium in the second chamber 22b can prevent the fluid, handled by the centrifugal pump, from entering through the sealing surfaces of the slip ring 10 and the counter ring 12 at the pump side. Further, the fluid barrier-and-cooling medium in the second chamber 22b prevents a decrease in pressure on the sealing surfaces of the slip ring 11 and the counter ring 13 at the atmospheric side, and can prevent the fluid barrier-and-cooling medium from leaking to the atmospheric side.

As described above, according to the present embodiment, even if the pump impeller 3 and the pump mechanism 19 rotate in the reverse direction, there is no danger of leakage. Therefore, even if the fluid, handled by the pump, contains a toxic or flammable fluid, the sealing system does not allow any leakage of such fluid to the atmospheric side.

Figure 4:
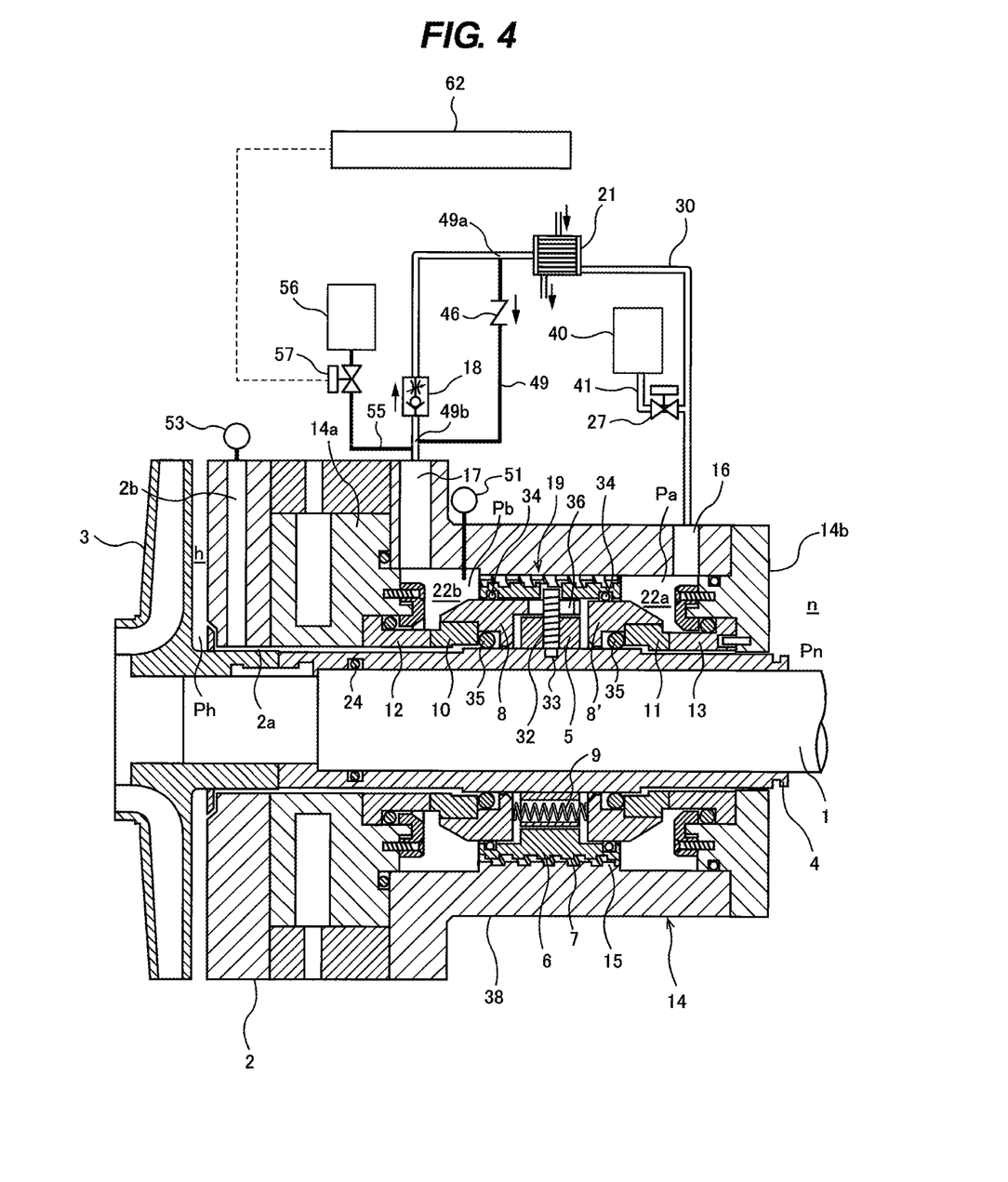
FIG. 4 is a diagram showing still another embodiment of the sealing system.

FIG. 4 is a diagram showing another embodiment of the sealing system. Configurations of this embodiment, which will not be particularly described, are the same as those of the embodiment shown in FIG. 3, and therefore their repetitive descriptions are omitted. When the pump impeller 3 and the pump mechanism 19 rotate in the reverse direction for a long time, temperatures of the pump mechanism 19 and its peripheral devices may increase. Thus, the embodiment shown in FIG. 4 has a function of cooling the pump mechanism 19 and its peripheral devices.

Both a first connection point 49a at which one end of a bypass line 49 is coupled to the medium circulation line 30 and a second connection point 49b at which the other end of the bypass line 49 is coupled to the medium circulation line 30 are located between the heat exchanger 21 and the second chamber 22b. More specifically, the first connection point 49a is located between the heat exchanger 21 and the throttle and check valve 18, and the second connection point 49b is located between the throttle and check valve 18 and the second chamber 22b.

The fluid barrier-and-cooling medium, delivered to the first chamber 22a by the reverse rotation of the pump mechanism 19, flows through the medium circulation line 30 and is cooled by the heat exchanger 21. The cooled fluid barrier-and-cooling medium flows into the bypass line 49 at the first connection point 49a, flows through the bypass line 49 into the second chamber 22b.

A check valve 46, attached to the bypass line 49, allows the fluid barrier-and-cooling medium to flow only in a direction from the first connection point 49a to the second connection point 49b (i.e., in a direction from the first chamber 22a to the second chamber 22b), and does not allow the fluid barrier-and-cooling medium to flow in the reverse direction.

The branch line 55 extending from the accumulator 56 is coupled to the medium circulation line 30. The connection point of the branch line 55 and the medium circulation line 30 is located between the second chamber 22b and the heat exchanger 21. More specifically, the connection point of the branch line 55 and the medium circulation line 30 is located between the second chamber 22b and the throttle and check valve 18. In one embodiment, the branch line 55 extending from the accumulator 56 may be coupled to the bypass line 49 at a position between the second chamber 22b and the check valve 46.

According to the present embodiment, even if the pump impeller 3 and the pump mechanism 19 rotate in the reverse direction for a long period of time, there is no danger of leakage. Therefore, even if the fluid, handled by the pump, contains a toxic or flammable fluid, the sealing system does not allow any leakage of such fluid to the atmospheric side.

Figure 5:
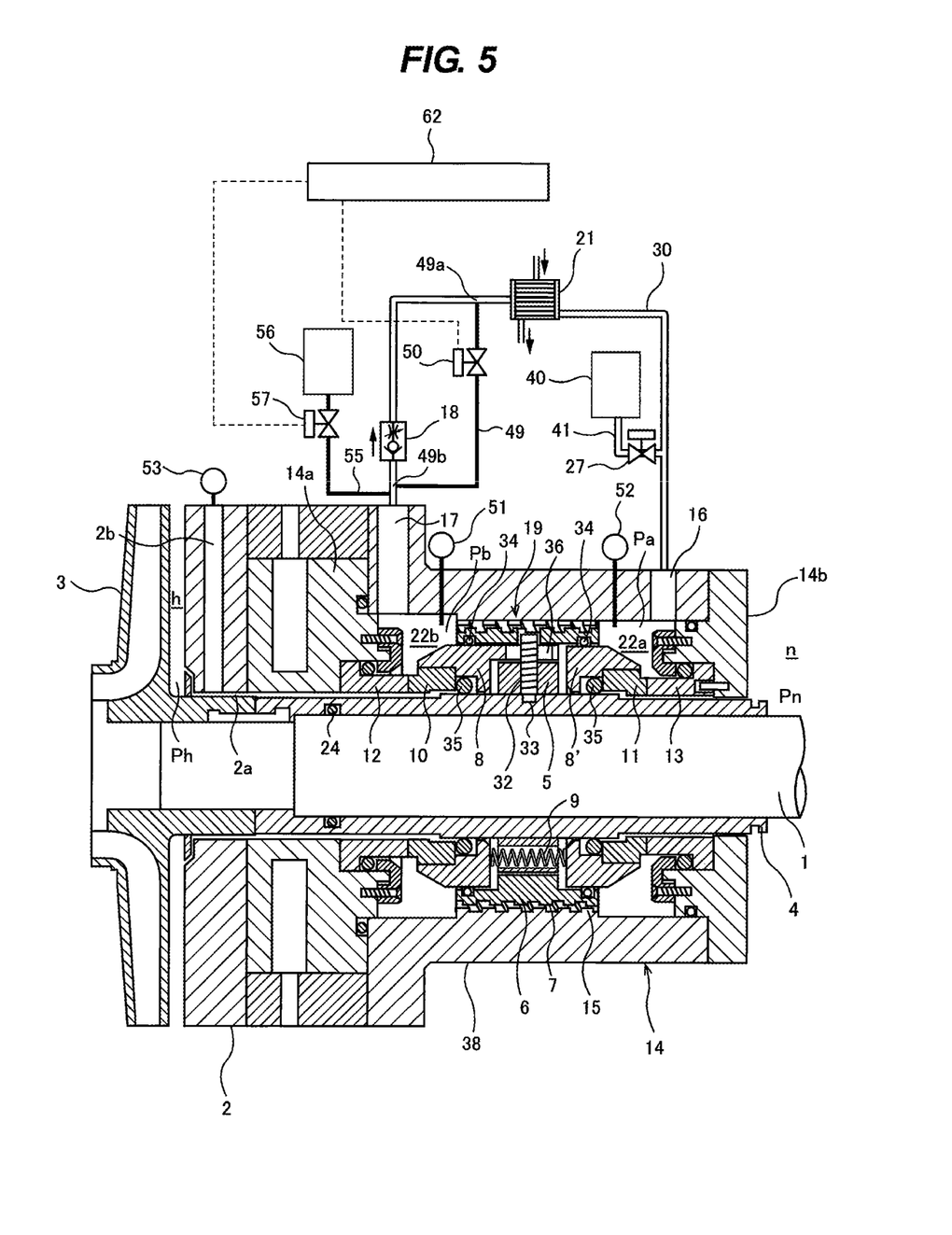
FIG. 5 is a diagram showing still another embodiment of the sealing system.

FIG. 5 is a view showing still another embodiment of the sealing system. Configurations of this embodiment, which will not be particularly described, are the same as those of the embodiment shown in FIG. 4, and therefore their repetitive descriptions are omitted. As shown in FIG. 5, in the present embodiment, instead of the check valve 46, an on-off valve 50 is attached to the bypass line 49. This on-off valve 50 is closed during normal operation, and is opened during a reverse rotation. The on-off valve 50 may preferably have a valve element comprising a ball valve or a butterfly valve, because the smaller the pressure loss, the smaller the pressure difference between the first chamber 22a and the second chamber 22b. The on-off valve 50 may comprise an electromagnetic valve, a motor-operated valve, a pneumatically driven valve, a hydraulically driven valve, or the like.

The sealing system includes the system controller 62 configured to control the operation of the on-off valve 50. Further, the sealing system includes the pressure detector 51 for measuring the pressure Pb in the second chamber 22b, and the pressure detector 52 for measuring the pressure Pa in the first chamber 22a. The pressure detectors 51, 52 are coupled to the system controller 62, which operates the on-off valve 50 based on the measured values of the pressure transmitted from the pressure detectors 51, 52. More specifically, when the pressure Pa of the fluid barrier-and-cooling medium in the first chamber 22a is higher than the pressure Pb of the fluid barrier-and-cooling medium in the second chamber 22b, the system controller 62 opens the on-off valve 50. When the on-off valve 50 is opened, the fluid barrier-and-cooling medium flows from the first chamber 22a into the bypass line 49 via the heat exchanger 21, and further flows through the bypass line 49 into the second chamber 22b.

The branch line 55 extending from the accumulator 56 is coupled to the medium circulation line 30. The connection point of the branch line 55 and the medium circulation line 30 is located between the second chamber 22b and the heat exchanger 21. More specifically, the connection point of the branch line 55 and the medium circulation line 30 is located between the second chamber 22b and the throttle and check valve 18. In one embodiment, the branch line 55 extending from the accumulator 56 may be coupled to the bypass line 49 at a position between the second chamber 22b and the on-off valve 50.

According to the present embodiment, even if the pump impeller 3 and the pump mechanism 19 rotate in the reverse direction for a long period of time, there is no danger of leakage. Therefore, even if the fluid, handled by the pump, contains a toxic or flammable fluid, the sealing system does not allow any leakage of such fluid to the atmospheric side.

It should be noted that the present invention is not limited to the above-described embodiments, and may include other embodiments in various forms within the scope of the technical concept of the present invention.

INDUSTRIAL APPLICABILITY

The present invention is applicable to a sealing system having a pump mechanism driven by a rotational shaft wherein the pump mechanism is provided between a pump-side sealing mechanism and an atmospheric-side sealing mechanism constituting a double mechanical seal.

The invention claimed is:

1. A sealing system for sealing a rotational shaft of a centrifugal pump, comprising:
   a double mechanical seal having a pump-side sealing mechanism and an atmospheric-side sealing mechanism;
   a pump mechanism driven by the rotational shaft, the pump mechanism being located between the pump-side sealing mechanism and the atmospheric-side sealing mechanism;
   a first chamber defined by at least the atmospheric-side sealing mechanism and the pump mechanism;
   a second chamber defined by at least the pump-side sealing mechanism and the pump mechanism;
   a first medium circulation line for circulating a fluid barrier-and-cooling medium between the first chamber and the second chamber, the first medium circulation line being coupled to the first chamber and the second chamber, the fluid barrier-and-cooling medium being different from a fluid handled by the centrifugal pump;
   a heat exchanger and a shut-off valve attached to the first medium circulation line;
   a second medium circulation line having both ends coupled to the first medium circulation line, the second medium circulation line bypassing the shut-off valve; and
   a medium pressurizing pump and an on-off valve attached to the second medium circulation line.

2. The sealing system according to claim 1, further comprising a seal housing that accommodates the double mechanical seal therein, the first medium circulation line and the second medium circulation line being located outside the seal housing.

3. The sealing system according to claim 1, further comprising:
   a power failure detector configured to detect a power failure of the centrifugal pump; and
   a system controller configured to, upon receiving a power failure detection signal transmitted from the power failure detector, close the shut-off valve, open the on-off valve, and start the medium pressurizing pump.

4. The sealing system according to claim 1, wherein:
   a first connection point at which one end of the second medium circulation line is coupled to the first medium circulation line is located between the shut-off valve and the heat exchanger; and
   a second connection point at which the other end of the second medium circulation line is coupled to the first medium circulation line is located between the shut-off valve and the second chamber.

5. The sealing system according to claim 1, further comprising a power source for supplying electric power to the medium pressurizing pump, the medium pressurizing pump having an electric motor as a prime mover.

6. The sealing system according to claim 1, wherein the fluid barrier-and-cooling medium is oil, and the medium pressurizing pump is an oil pump.

* * * * *